US010543921B2

(12) United States Patent
Augé et al.

(10) Patent No.: US 10,543,921 B2
(45) Date of Patent: Jan. 28, 2020

(54) LIGHTWEIGHT SEAT

(71) Applicant: Safran Seats, Issoudun (FR)

(72) Inventors: Philippe Augé, Brax (FR); Mathieu Nové, Villeurbanne (FR); José Bernardo De Morais, Chateauroux (FR); Vincent Raffin, Issoudun (FR); David Le Mestre, Vineuil (FR); Jean Charles Marais, Sainte Lizaigne (FR); Joël Marais, Charost (FR)

(73) Assignee: Safran Seats, Plaisir (FR)

( * ) Notice: Subject to any disclaimer, the term of this patent is extended or adjusted under 35 U.S.C. 154(b) by 123 days.

(21) Appl. No.: 15/128,148

(22) PCT Filed: Mar. 30, 2015

(86) PCT No.: PCT/IB2015/052347
§ 371 (c)(1),
(2) Date: Sep. 22, 2016

(87) PCT Pub. No.: WO2015/145410
PCT Pub. Date: Oct. 1, 2015

(65) Prior Publication Data
US 2017/0101188 A1    Apr. 13, 2017

Related U.S. Application Data

(60) Provisional application No. 61/971,707, filed on Mar. 28, 2014.

(51) Int. Cl.
*B64D 11/06* (2006.01)
*B60N 2/75* (2018.01)

(52) U.S. Cl.
CPC .......... *B64D 11/0644* (2014.12); *B60N 2/753* (2018.02); *B60N 2/76* (2018.02);
(Continued)

(58) Field of Classification Search
CPC .. B64D 11/0644; B64D 11/0649; B60N 2/75; B60N 2/753; B60N 2/76; B60N 2/763; B60N 2/78
(Continued)

(56) References Cited

U.S. PATENT DOCUMENTS 4,533,175 A     8/1985  Brennan
5,056,868 A *  10/1991  Beck ...................... A47C 7/543
                                              297/411.29
(Continued)

FOREIGN PATENT DOCUMENTS

DE    3110515          11/1982
DE    3128653 A1 *   2/1983  ............. B60N 2/753
(Continued)

OTHER PUBLICATIONS

International Patent Application No. PCT/IB2015/052347, Invitation to Pay Additional Fees and, Where Applicable, Protest Fee and Partial Search Report dated Jul. 14, 2015.
(Continued)

*Primary Examiner* — Ryan D Kwiecinski
(74) *Attorney, Agent, or Firm* — Kilpatrick Townsend & Stockton LLP

(57) ABSTRACT

Disclosed is a lightweight seat (100) that includes a seat base (102), a seat bottom (103) attached to an upper portion of the seat base, a seat back (101) attached to a rear portion of the seat bottom, and a seat belt assembly (150) secured to the seat bottom. The seat belt assembly may include a strap (104) attached to an underside of the seat bottom and extending from a first end adjacent to first side of the seat bottom to a second end adjacent to a second side of the seat bottom and a seat belt disposed adjacent to an upper side of the seat bottom, wherein a first end of the seat belt is
(Continued)

attached to the first end of the strap and a second end of the seat belt is attached to the second end of the strap.

10 Claims, 7 Drawing Sheets

(52) U.S. Cl.
CPC ............ *B60N 2/763* (2018.02); *B64D 11/062* (2014.12); *B64D 11/0638* (2014.12); *B64D 11/0649* (2014.12)

(58) Field of Classification Search
USPC .......................................... 297/411.2, 411.32
See application file for complete search history.

(56) References Cited

U.S. PATENT DOCUMENTS

| | | | | |
|---|---|---|---|---|
| 5,769,495 | A * | 6/1998 | Vairinen | A47C 1/03 |
| | | | | 297/411.32 |
| 6,203,101 | B1 * | 3/2001 | Chou | A47C 7/543 |
| | | | | 297/115 |
| 6,375,265 | B1 * | 4/2002 | Hubner | B60N 2/767 |
| | | | | 297/411.32 |
| 7,726,607 | B2 * | 6/2010 | Schumacher | B60N 2/22 |
| | | | | 244/122 R |
| 8,931,847 | B2 * | 1/2015 | Cailleteau | B60N 2/0224 |
| | | | | 297/411.32 |
| 2015/0123447 | A1 * | 5/2015 | Warren, Jr. | A61G 7/051 |
| | | | | 297/411.32 |

FOREIGN PATENT DOCUMENTS

| | | | | | |
|---|---|---|---|---|---|
| DE | | 3344707 | A1 * | 6/1985 | ............ B60N 2/753 |
| DE | | 4437244 | | 4/1996 | |
| DE | | 19704469 | A1 * | 7/1998 | ............ A47C 7/543 |
| EP | | 0148619 | | 7/1985 | |
| FR | | 2315241 | A1 * | 1/1977 | ............ B60N 2/753 |
| WO | | 2015145410 | | 10/2015 | |
| WO | WO-2015149120 | | A1 * | 10/2015 | |

OTHER PUBLICATIONS

International Patent Application No. PCT/IB2015/052347, Search Report and Written Opinion dated Sep. 24, 2015.

\* cited by examiner

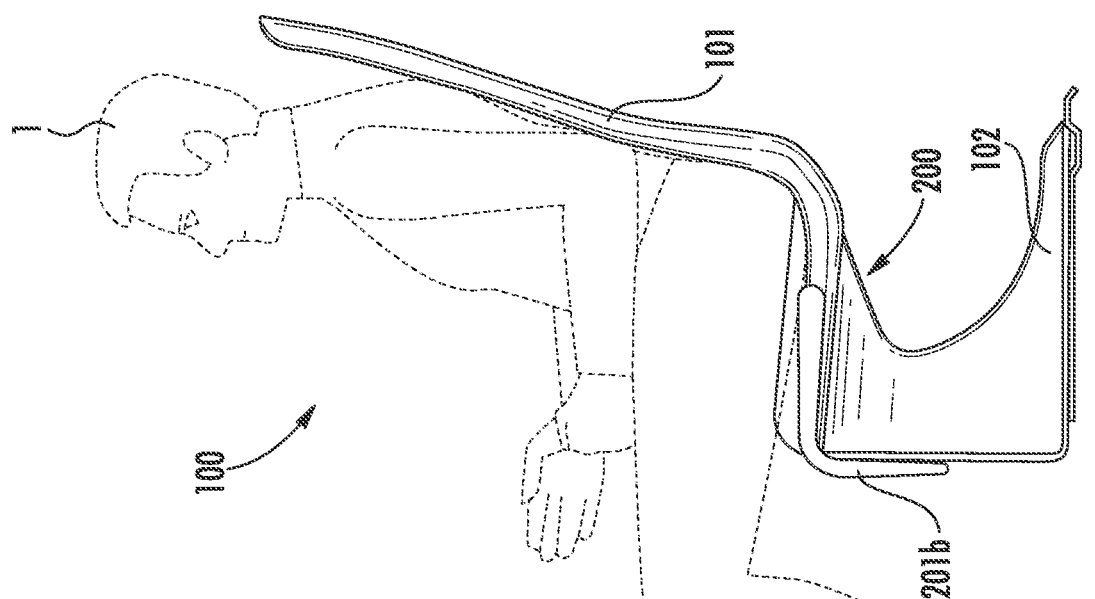
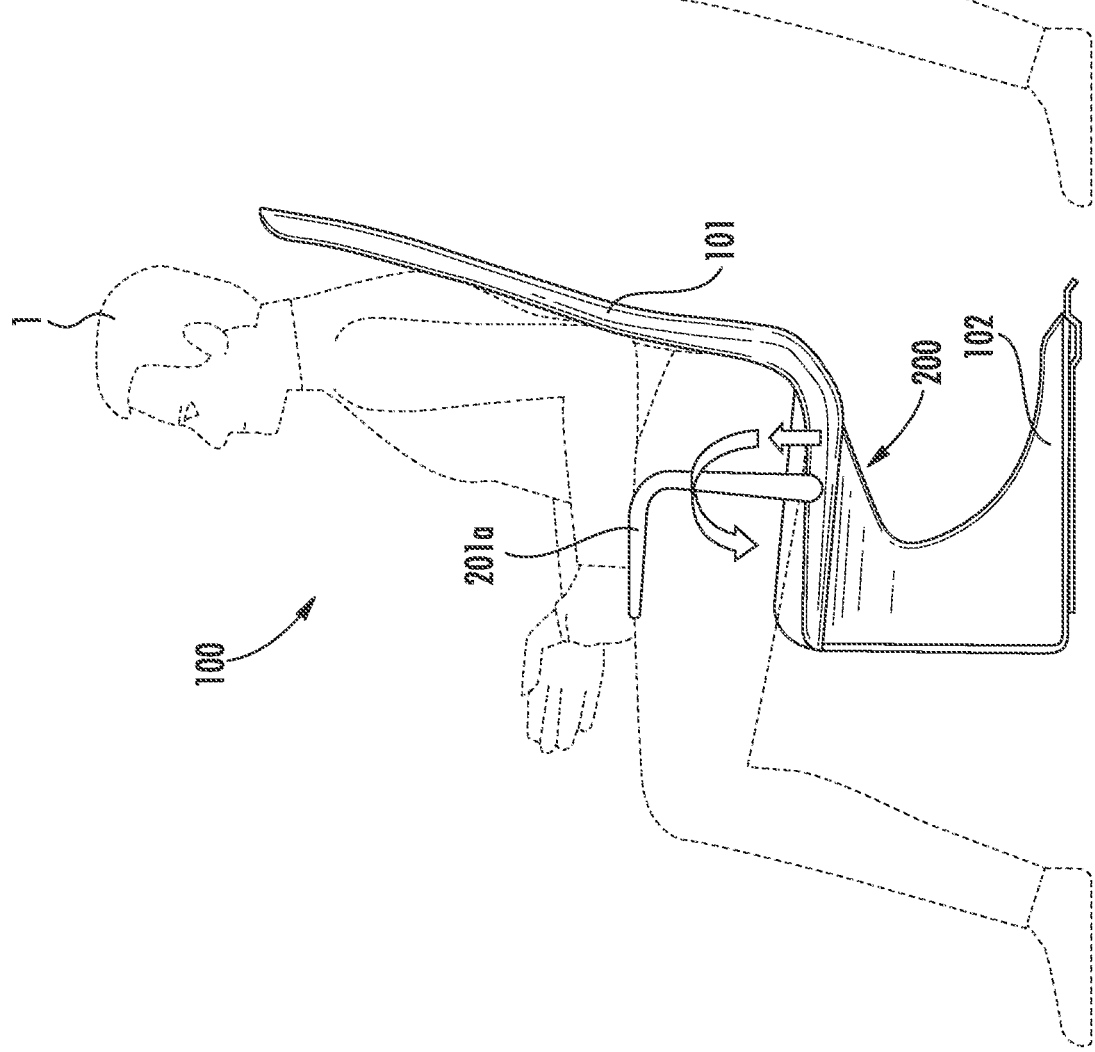

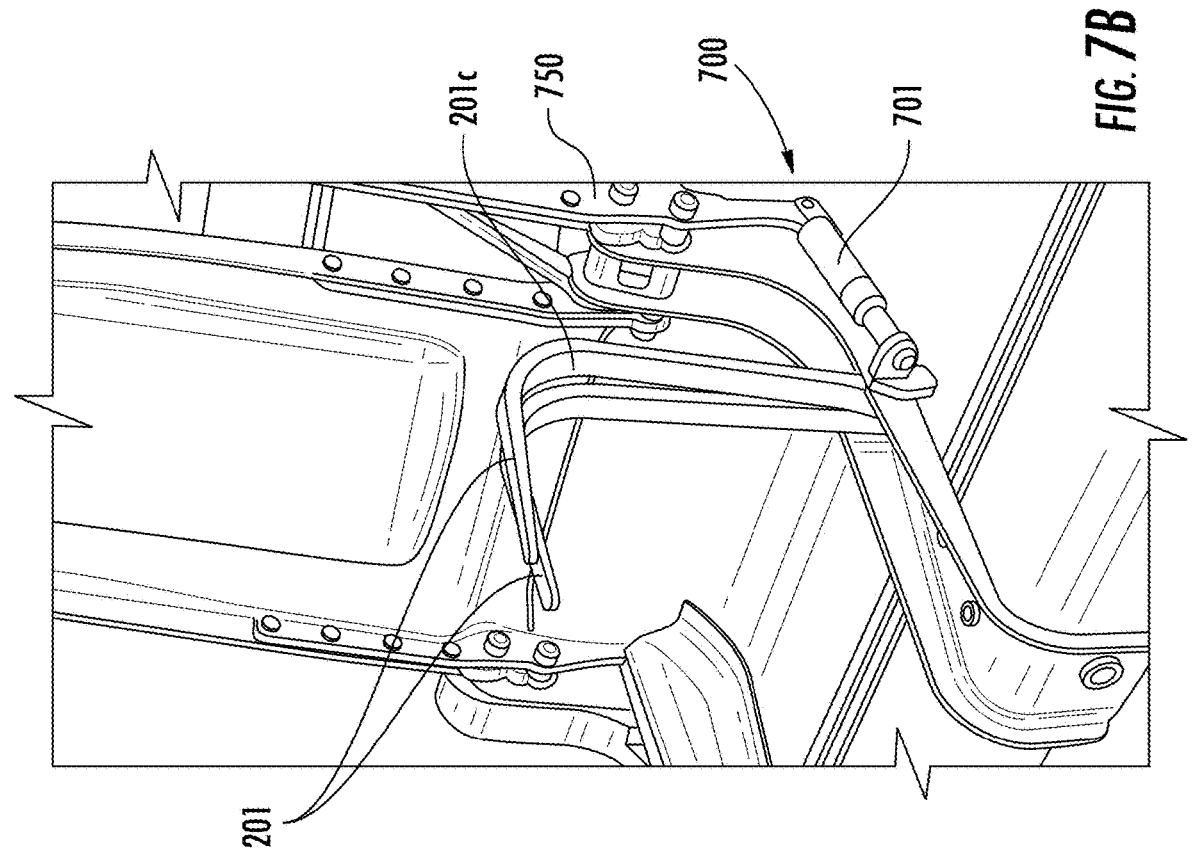
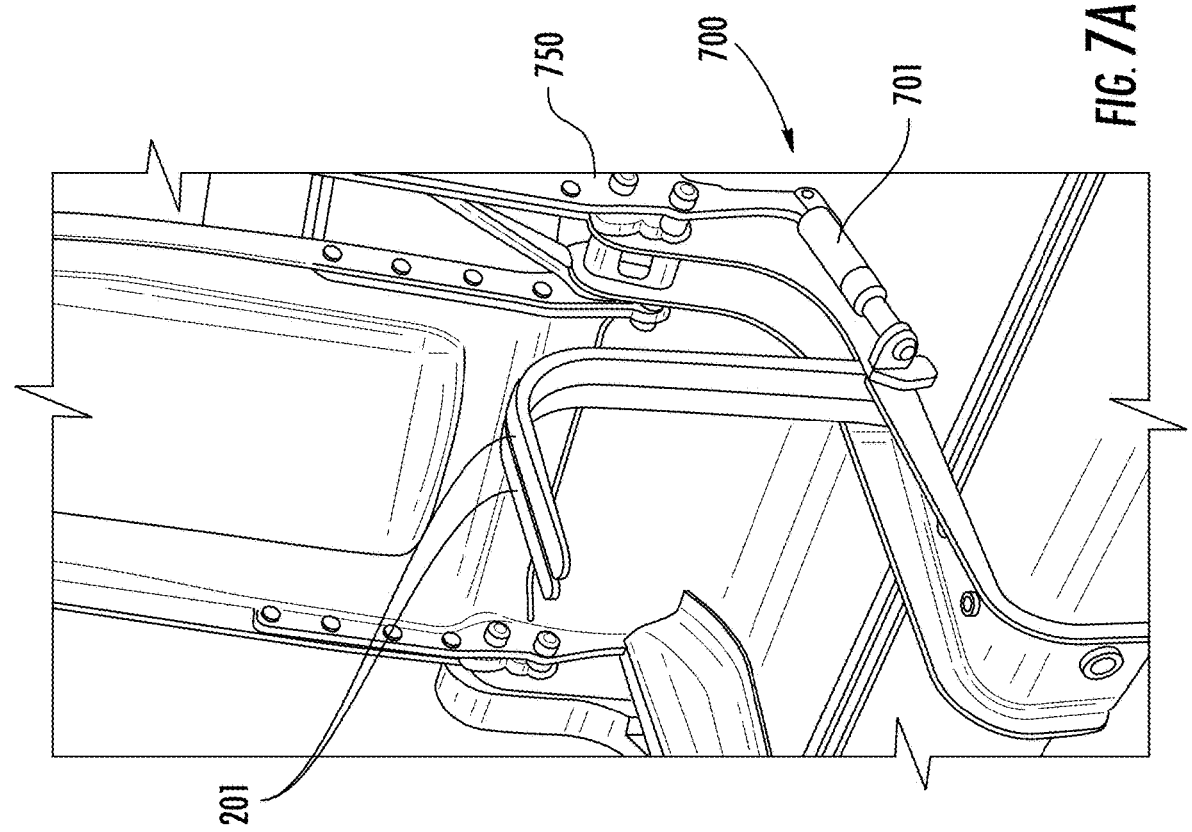

LIGHTWEIGHT SEAT

CROSS REFERENCE TO RELATED APPLICATIONS

This application is the U.S. national phase entry of International Patent Application Serial No. PCT/IB2015/052347 ("the '347 application"), filed on Mar. 30, 2015, which application is related to and claims priority benefits from U.S. Provisional Application Ser. No. 61/971,707 ("the '707 application"), filed on Mar. 28, 2014, entitled LIGHTWEIGHT SEAT FOR PASSENGER AIRCRAFT. The '347 and '707 applications are hereby incorporated in their entireties by this reference.

FIELD OF THE INVENTION

The field of the invention relates lightweight passenger seats for aircraft or the like.

BACKGROUND

Many passenger seats such as those on passenger aircraft, buses, trains, and the like account for significant weight of the vehicle but must meet other requirements related to passenger comfort, safety, and convenience. For example, seat structural assemblies are designed to meet specific loading conditions (e.g., crash conditions), and seats often include safety and convenience features (which may be moveable or deployable) including, for example, seat belts, arm rests, tray tables, cocktail tables, and the like. The structural design of conventional seats along with the design of the comfort and convenience features may include inefficiencies that lead to extra undesirable weight.

In certain situations, it may be desirable to design seats and related subcomponents to maximize structural efficiency with load paths configured to transfer load from the passenger through the seat and into the structure of the aircraft. Efficient structural design facilitates lighter designs using less material.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a lightweight seat comprises: a seat base; a seat bottom attached to an upper portion of the seat base; a seat back attached to a rear portion of the seat bottom; and an arm rest assembly attached to the seat bottom configured to move between a deployed position and a stowed position, wherein the arm rest assembly comprises: an arm rest with a first portion having a first end and a second end, and a second portion attached to the second end of the first portion; and an articulating fitting attached to the seat bottom configured to interface with the first end of the first portion of the arm rest, wherein the arm rest is configured to pivot approximately 90 degrees with respect to the articulating fitting.

In some embodiments, the first portion of the arm rest comprises a pin configured to interface with a hole in the articulating fitting, wherein the arm rest rotates about the pin. The hole in the articulating fitting, in certain embodiments, is an elongated slot.

In certain embodiments, the first portion of the arm rest comprises a tapered stud fitting extending in a direction parallel to the length of the first portion of the arm rest. In some embodiments, the tapered stud fitting is configured to engage a locking cavity in the articulating fitting. In certain embodiments, the tapered stud fitting engages the locking cavity when the arm rest is in the deployed position, and the tapered stud fitting has a partial cone shape and the locking cavity has a complementary shape.

The arm rest assembly, in some embodiments, comprises a direct connection to a seat recline mechanism.

According to certain embodiments of the present invention, a lightweight seat comprises: a seat base; a seat bottom attached to an upper portion of the seat base; a seat back attached to a rear portion of the seat bottom; and a hollow arm rest assembly attached to the seat back wherein the hollow arm rest assembly comprises a root fitting and a flexible blade forming a loop where the flexible blade is attached to the root fitting.

The hollow arm rest assembly, in certain embodiments, is designed to flex based on an elasticity of the flexible blade and geometry of the flexible blade.

According to certain embodiments of the present invention, a lightweight seat comprises a seat base; a seat bottom attached to an upper portion of the seat base; and a multifunction tray table assembly disposed adjacent to the seat bottom and configured to move between a deployed position and a stowed position, wherein the multifunction tray table assembly comprises: an upright arm with a lower arm attached to a lower end of the upright arm; and at least one pivot face hingedly attached to an upper end of the upright arm; and at least one tray table hingedly attached to the at least one pivot face.

The lightweight seat, in some embodiments, is configured such that a pivot axis of the at least one pivot face with respect to the upright arm is perpendicular to the pivot axis of the tray table with respect to the at least one pivot face.

In certain embodiments, the at least one pivot face comprises two pivot faces that are each hingedly attached to the upright arm; and the at least one tray table comprises two tray tables, wherein each tray table is hingedly attached to one of the pivot faces, and the two tray tables are configured to pivot in opposite directions of one another.

In some embodiments, the multifunction tray table assembly functions as both an arm rest and divider between passenger seats when in the stowed position.

In certain embodiments, the at least one pivot face comprises a static portion that does not move and functions as an arm rest when the multifunction tray table assembly is in the deployed position.

According to certain embodiments of the present invention, a lightweight seat comprises: a seat base; a seat bottom attached to an upper portion of the seat base; a seat back attached to a rear portion of the seat bottom; and a seat back tray table assembly configured to move between a deployed position and a stowed position, wherein the seat back tray table assembly comprises: a tray table pivotably attached to a rear surface of the seat back; and a biasing member with a first end attached to the tray table and a second end attached to the seat back.

In some embodiments, when the seat back tray table assembly is configured in the deployed position, the biasing member pushes the tray table toward the deployed position; and when the seat back tray table assembly is configured in the stowed position, the biasing member pushes the tray table toward the stowed position.

According to certain embodiments of the present invention, a lightweight seat comprises: a seat base; a seat bottom attached to an upper portion of the seat base; and a seat belt assembly secured to the seat bottom, wherein the seat belt assembly comprises: a strap attached to an underside of the seat bottom and extending from a first end adjacent to first side of the seat bottom to a second end adjacent to a second side of the seat bottom; and a seat belt disposed adjacent to an upper side of the seat bottom, wherein a first end of the seat belt is attached to the first end of the strap and a second end of the seat belt is attached to the second end of the strap.

In some embodiments, the seat bottom comprises at least one hole wherein the strap passes through the at least one hole.

The at least one hole, in certain embodiments, comprises two holes disposed on opposite sides of the seat bottom.

In some embodiments, the underside of the seat bottom comprises a groove or boss configured to guide the strap into a position.

The lightweight seat, in certain embodiments, further comprises a seat back attached to a rear portion of the seat bottom.

In certain embodiments, the lightweight seat further comprises an arm rest assembly attached to the seat bottom configured to move between a deployed position and a stowed position, wherein the arm rest assembly comprises: an arm rest with a first portion having a first end and a second end and a second portion attached to the second end of the first portion; and an articulating fitting attached to the seat bottom configured to interface with the first end of the first portion of the arm rest, wherein the arm rest is configured to pivot approximately 90 degrees with respect to the articulating fitting.

The lightweight seat, in some embodiments, further comprises a multifunction tray table assembly disposed adjacent to the seat bottom configured to move between a deployed position and a stowed position, wherein the multifunction tray table assembly comprises: an upright arm with a lower arm attached to a lower end of the upright arm; and at least one pivot face hingedly attached to an upper end of the upright arm; and at least one tray table hingedly attached to the at least one pivot face.

In some embodiments, the lightweight seat further comprises a hollow arm rest assembly attached to the seat back wherein the hollow arm rest assembly comprises a root fitting and a flexible blade forming a loop where the flexible blade is attached to the root fitting.

BRIEF DESCRIPTION OF THE DRAWINGS

FIGS. 2A and 2B are side views of lightweight seats according to certain embodiments of the present invention.

FIGS. 7A and 7B are detail perspective views of lightweight seats according to certain embodiments of the present invention.

DETAILED DESCRIPTION

Figure 1:
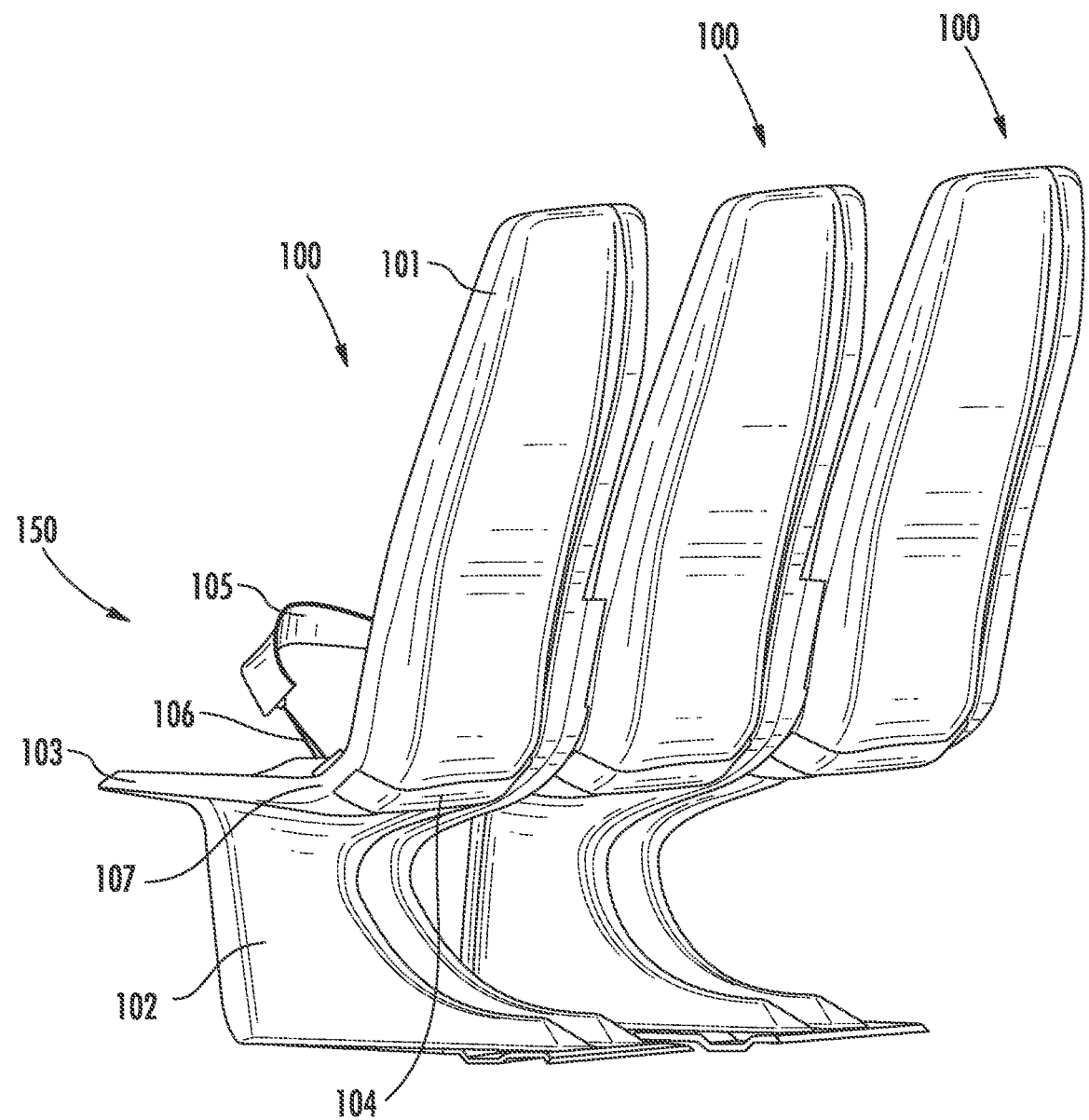
FIG. 1 is a perspective view of lightweight seats according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-6B illustrate embodiments of a lightweight seat 100. In these embodiments, the lightweight seat 100 comprises a seat back 101, a seat base 102, and a seat bottom 103. The seat bottom 103 may be attached to an upper portion of the seat base 102. In some embodiments, each seat 100 is independent of all other seats 100. In some embodiments, multiple seats 100 are formed together as a single unit to reduce the total number of load paths and to efficiently transfer load from the seats to the aircraft structure.

Seat Belt Assembly

As shown in FIG. 1, the lightweight seat 100 may include a seat belt assembly 150 secured to the seat bottom 103, and the seat belt assembly 150 may comprise (1) a strap 104 attached to an underside of the seat bottom 103 and extending from a first end adjacent to first side of the seat bottom 103 to a second end adjacent to a second side of the seat bottom 103 and (2) a seat belt 105 may be disposed adjacent to an upper side of the seat bottom 103, wherein a first end of the seat belt 105 is attached to the first end of the strap 104 and a second end of the seat belt 105 is attached to the second end of the strap 104. In some embodiments, the strap 104 crosses the entire width of the seat and is disposed adjacent to the interface between the seat bottom 103 and the seat back 101.

Conventional seat belts often attach (at each end of the belt) to discrete points, such as a metallic stud or fitting installed on either side of the seat. However, such a design not only requires the metallic stud or fitting, but also requires additional material in the seat for mounting the metallic stud or fitting and for distributing the localized loads associated with the metallic stud or fitting.

The strap 104 is configured to distribute loads from the seat belt 105 due to passenger 1. Because the strap 104 contacts the underside of the seat bottom 103 across the entire width of the seat bottom 103, all loads from the seat belt 105 are evenly distributed into the seat bottom 103 (and subsequently into the base 102, which includes structural attachment to the aircraft). Such a design results in less material required for distributing loads from the seat belt into the aircraft structure. The strap 104 may include periodic attachments along the full length to the underside of the seat bottom 103 (e.g., adhesive or mechanical fasteners). In some embodiments (in addition to or as a substitute for the periodic attachments), the underside of the seat bottom 103 may include one or more features configured to secure the strap 104 in a desired position. For example, the underside of the seat bottom 103 may include a groove or a plurality of bosses (extending along a partial or a full length of the strap 104) configured to hold the strap 104 in a structurally advantageous position. The lightweight seat 100 may include a device configured to mount and/or tension the strap 104 at each end.

In some embodiments, adjacent to each end, the strap 104 may pass through a hole or slot 107 in the seat bottom 103. The hole or slot 107 may guide the strap 104 and may facilitate the device for mounting or tensioning the strap 104. One or both ends of the strap 104 may be attached to a connection portion 106, which secures the strap 104 to the seat belt 105. The seat belt 105 interfaces with the passenger 1 and may be a lap belt, 5-point harness or other mechanism.

The components of the lightweight seat 100 may be formed of materials including, but not limited to, carbon composite, plastic, thermoplastic, steel, aluminum, stainless steel, other plastic or polymer materials, other metallic materials, other composite materials, or other similar materials. Moreover, the components of the lightweight seat 100 may be attached to one another via suitable fasteners, which include, but are not limited to, screws, bolts, rivets or other mechanical or chemical fasteners.

Bottom-Mount Arm Rest Assembly

As shown in FIGS. 2A and 2B, the lightweight seat 100 may include a bottom-mount arm rest assembly 200 that includes an arm rest 201 that is configured to move between a deployed position 201a and a stowed position 201b. The arm rest 201 includes a first portion 202 and a second portion 203. The arm rest 201 may be mounted using an articulating fitting 220 secured at the interface of the seat base 102 and the seat bottom 103. Due to the proximity of the mount to the structure of the seat base 102, an efficient load path is created. Although the stowed position 201b is illustrated in FIG. 2B otherwise, in some embodiments in the stowed position 201b, the arm rest 201 may be flush with one or both of the seat base 102 and the seat bottom 103. In other words, when seen from the side view shown in FIG. 2B, the first portion 202 of the arm rest 201 may be flush with the upper surface of the seat bottom 103 and the second portion 203 of the arm rest 201 may be flush with the front surface of the seat base 102.

Figure 3C:
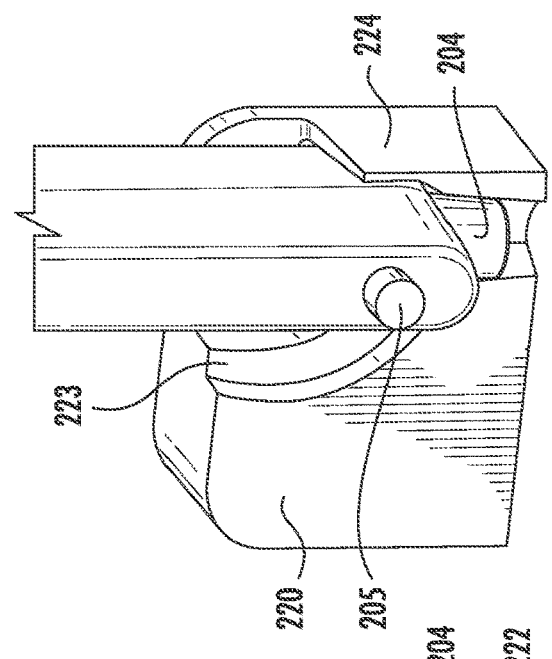
FIGS. 3A, 3B, and 3C are detail perspective views of the lightweight seats of FIGS. 2A and 2B.
Figure 3B:
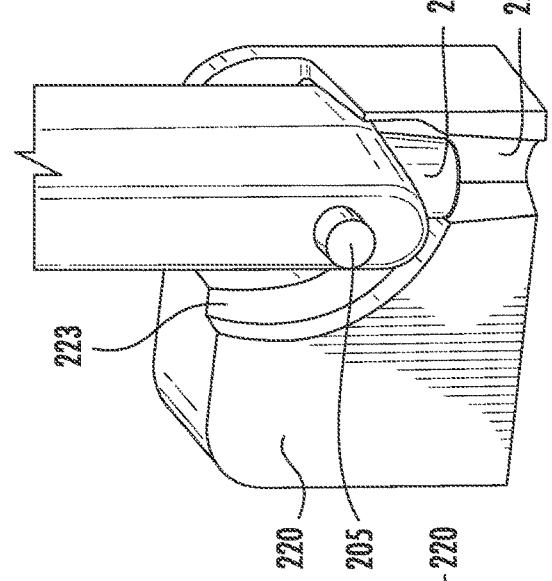
Figure 3A:
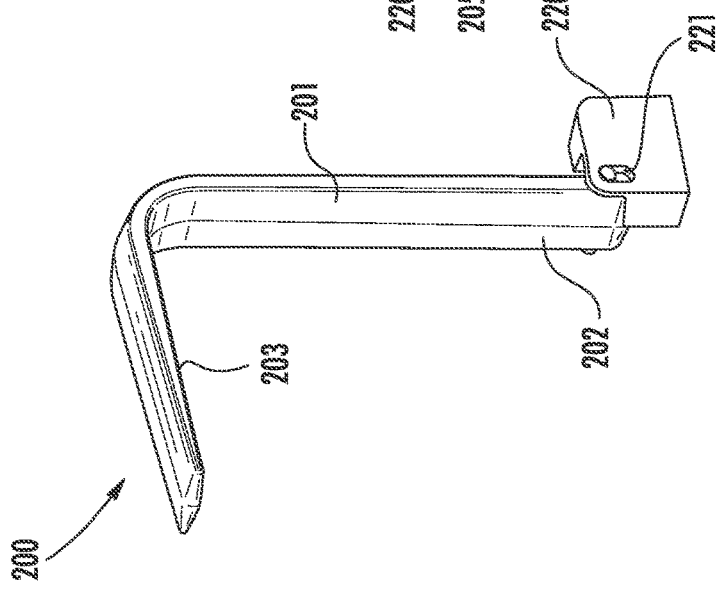

The articulating fitting 220 for the bottom-mount arm rest assembly 200 is shown in FIGS. 3A-3C. The articulating fitting 220 (only half of which is shown, for clarity) allows the arm rest 201 to pivot about a pin 205 (attached to the first portion 202) such that the end of the arm rest 201 travels through rotation slot 223 (see FIGS. 3B and 3C). The articulating fitting 220 is configured such that the arm rest 201 can only rotate between the deployed position 201a and the stowed position 201b because rotation-limiting wall 224 is arranged to impinge on the end of the arm rest 201 (see FIG. 3C).

The articulating fitting 220 also includes a lock or detent features to hold the arm rest 201 in the deployed position 201a. As the arm rest 201 rotates toward the deployed position (see FIG. 3B), a tapered stud fitting 204 on the end of the arm rest 201 is inserted into a locking cavity 222. The tapered stud fitting 204 has a partial cone shape and the locking cavity 222 has a complementary shape. The arm rest 201 rotates around pin 205 until the tapered stud fitting 204 is directly above locking cavity 222. Subsequently, gravity pulls the tapered stud fitting 204 towards the locking cavity 222 until the tapered stud fitting 204 engages the locking cavity 222.

The vertical movement of the arm rest 201 is constrained by the movement of the pin 205 within hole or slot 221 (see FIG. 3A). Hole or slot 221 may be a circular hole or, as shown in FIG. 3A, may be an elongated slot. The full depth insertion of stud fitting 204 into locking cavity 222 (see FIG. 3C) approximately corresponds to a condition where the pin 205 reaches the bottom of the slot 221. Once the stud fitting 204 is inserted into locking cavity 222, the arm rest 201 is secure in the deployed position 201a.

To move the arm rest 201 from the deployed position 201a, the passenger 1 lifts the arm rest 201 such that pin 205 moves toward the upper end of the slot 221 and stud fitting 204 pulls out of locking cavity 222 (see FIGS. 3A and 3B). Once stud fitting 204 is out of locking cavity 222, the arm rest is free to rotate about pin 205 where stud fitting 204 travels through rotation slot 223. After approximately 90 degrees of rotation (with pin 205 in the upper portion of slot 221), the surface of arm rest 201 contacts the limiting wall 224 and the arm rest 201 is secured in the stowed position 201b.

As shown in FIGS. 7A and 7B, the arm rest 201 may be split into two halves such that one or both halves may be deployed. FIG. 7A shows both halves deployed. In some embodiments, the arm rest 201 may directly connect to a seat recline mechanism 700. The seat recline mechanism 700 may include a gas piston 701 that extends between a connection to the arm rest 201 and a structural member 750 of the seat back 101. One example of operating the seat recline mechanism 700 is shown in FIG. 7B where the arm rest 201 is rotated to an activation position 201c. The movement of arm rest 201 to activation position 201c engages seat recline mechanism 700 such that a passenger can adjust the recline angle of the seat back 101 while the arm rest 201 is in activation position 201c. The direct interface between the arm rest 201 and the seat recline mechanism 700 eliminates the push-button and associated cable linkage used in some seat designs.

Seat Back Tray Table Assembly

Figure 4A:
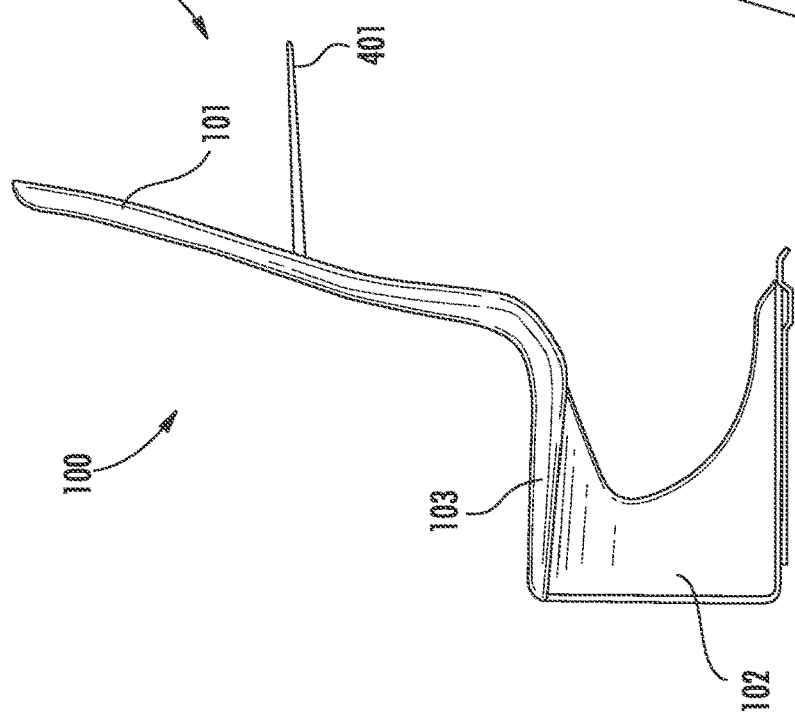
FIGS. 4A, 4B, and 4C are side views of lightweight seats according to certain embodiments of the present invention.
Figure 4B:
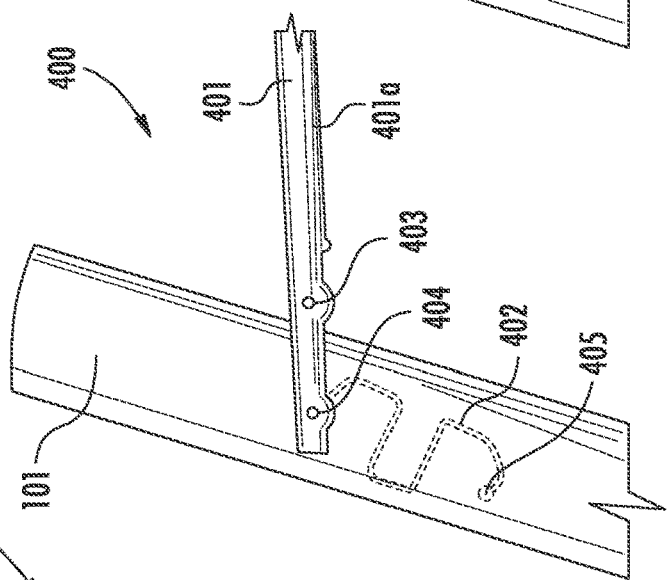
Figure 4C:
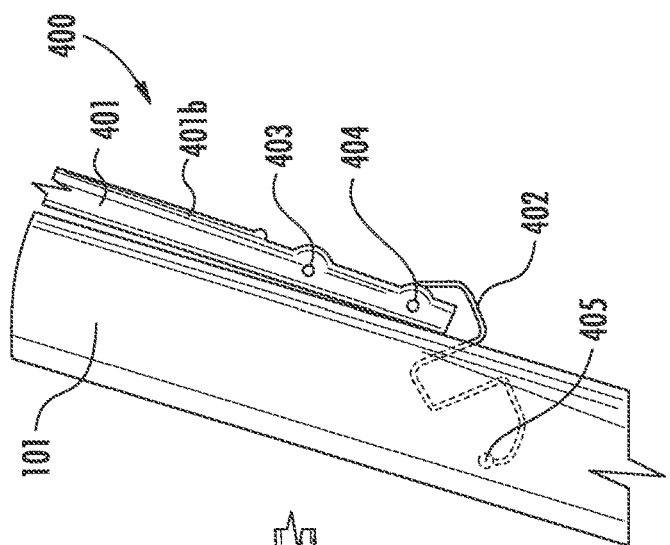

As shown in FIGS. 4A-4C, the lightweight seat 100 may include a seat back tray table assembly 400 with a tray table 401 configured to move between a deployed position 401a (FIG. 4B) and a stowed position 401b (FIG. 4C). The tray table assembly 400 is attached to the rear surface of the seat back 101. In some embodiments, the tray table 401 pivots about a hinge 403 such that the tray table 401 is pressed approximately flat against the surface of the seat back 101 when in the stowed position (see FIG. 4C) and is held approximately horizontal in the deployed position (FIG. 4B).

The seat back tray table assembly 400 may include a biasing member 402 that is mounted to the tray table 401 at mounting point 404. The other end of the biasing member 402 is attached inside a cavity of seat back 101 at anchor point 405. The biasing member 402 is compressed such that it acts as a spring and continuously presses the mounting point 404 away from the anchor point 405. When the tray table 401 is in the deployed position 401a (or near the deployed position), the biasing member 402 pushes the mounting point 404 upwards with respect to the seat back 101 such that the tray table 401 will rotate about hinge 403 such that mounting point 404 moves upward with respect to the seat back 101 and the tray table moves toward the deployed position, as shown in FIG. 4B. The tray table 401 will rotate until contacting a permanent rotation stop that prevents the tray table 401 from rotating past the deployed position, which is approximately horizontal.

When rotated past approximately halfway from the deployed position 401a toward the stowed position 401b, the tray table 401 moves as the biasing member 402 pushes the mounting point 404 such that it rotates about hinge 403. In particular, the mounting point 404 moves rearward with respect to the seat back 101 (as shown in FIG. 4C) toward the stowed position 401b.

Many conventional tray table assemblies include a discrete latch to secure the free end of the tray table (i.e., the end of the table closer to the passenger when deployed). However, the function of the biasing member 402 eliminates the need for a latching mechanism for the seat back tray table assembly 400. In addition to removing the weight of a latch mechanism, the load path associated with the tray table are simplified such that all tray table loads are distributed through hinge 403 and/or anchor point 405.

Multifunction Tray Table Assembly

Figure 5A:
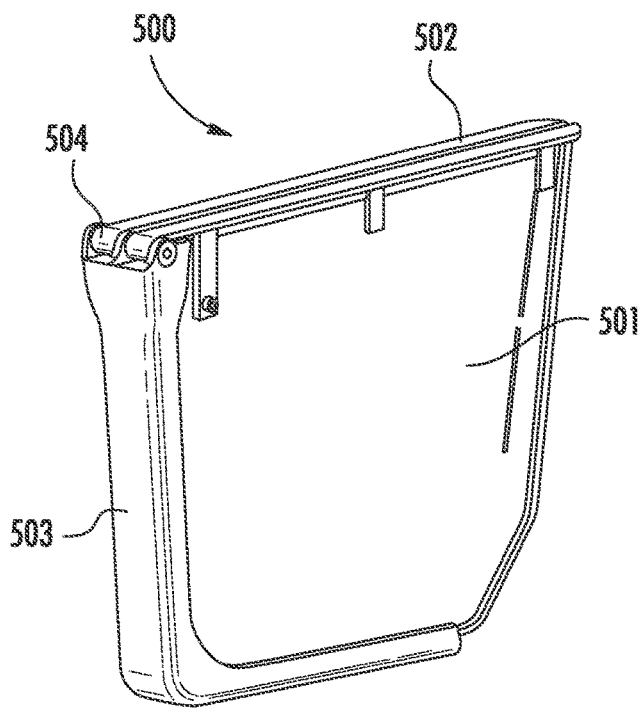
FIGS. 5A, 5B, and 5C are detail perspective views of lightweight seats according to certain embodiments of the present invention.
Figure 5B:
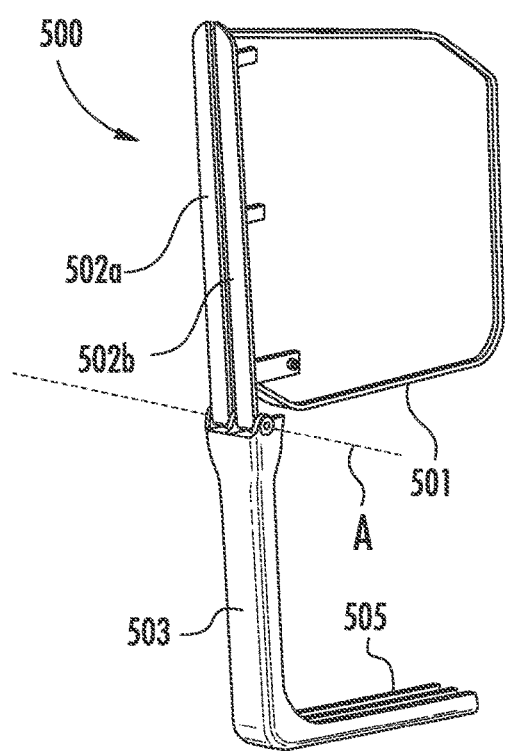
Figure 5C:
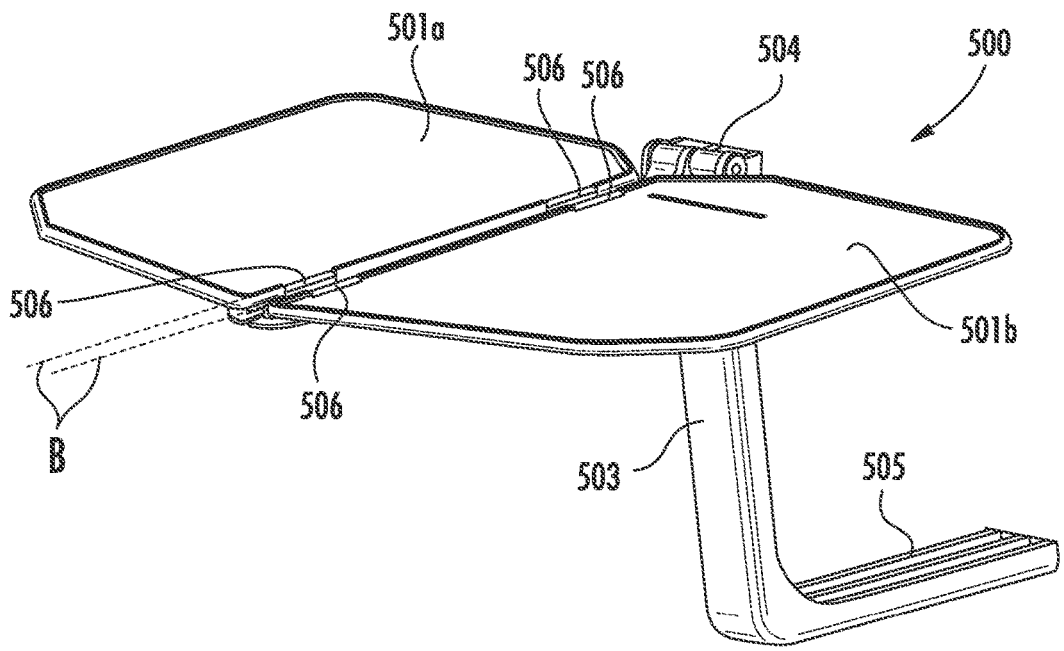

As shown in FIGS. 5A-5C, the lightweight seat 100 may include a multifunction tray table assembly 500 with a tray table 501 configured to move between a stowed position (FIG. 5A) and a deployed position (FIG. 5C). The tray table assembly 500 is disposed adjacent to the seat bottom 103 and/or the seat base 102. In some embodiments, the tray table assembly 500 is disposed between two adjacent lightweight seats 100. When in the stowed position, the pivot face 502 may function as an arm rest and the tray table assembly 500 as a whole (particularly, the tray table 501) may function as a divider between two adjacent lightweight seats 100. The upper surface of pivot face 502 (see FIG. 5A) may include a padded surface for functioning as an arm rest. FIG. 5A shows that, in the stowed position, the tray table 501, which is attached to the underside of the pivot face 502, is cradled by the upright arm 503 and the lower arm 505.

FIG. 5B shows an intermediate position between the stowed and deployed positions. The pivot face 502 (which has tray table 501 attached thereto) rotates about hinge 504 (pivot axis A). As shown in FIG. 5B, in some embodiments, the pivot face 502 includes two faces, first face 502a and second face 502b where each face is attached to a separate tray table (first tray table 501a is attached to first face 502a and second tray table 501b is attached to second face 502b). These two mechanisms may be constrained together such that if one of the tray tables (501a or 501b) moves from the stowed position (FIG. 5A), the remaining tray table will also move. In some embodiments, the two tray tables are independent from one another and pivot in opposite directions where each tray table is configured for a separate passenger. For example, a passenger could pivot the first face 502a and the associated first tray table 501a to a deployed position (see FIG. 5C) while leaving the second face 502b and the associated second tray table 501b in the stowed position (see FIG. 5A). In other words, if the multifunction tray table assembly 500 is disposed between two adjacent passenger seats, a passenger 1 on a first side can deploy his tray table without disturbing the passenger on the second side.

To move from the stowed position (FIG. 5A) to the deployed position (FIG. 5C), the first face 502a and the second face 502b rotate approximately 180 degrees about hinge 504 (pivot axis A). To reach the final deployed position, the first tray table 501a and the second tray table 501b each pivot approximately 90 degrees about hinges 506 (pivot axes B). Although the figures show that each tray table has two hinges 506, the tray tables may have any number of hinges (including one for each tray table). In some embodiments, as shown in FIGS. 5B and 5C, the pivot axis of the pivot face 502 (first face 502a and second face 502b) with respect to the upright arm 503 (pivot axes A) may be perpendicular to pivot axes B of the tray table 501 (first tray table 501a and the second tray table 501b) with respect to the pivot face 502 (first face 502a and second face 502b). In other words, the pivot axis of hinge 504 (pivot axis A) may be perpendicular to the pivot axes of hinges 506 (pivot axes B).

As shown in FIG. 5C, deploying both the first tray table 501a and the second tray table 501b eliminates the arm rest and divider functions described above. However, although not shown in the figures, in some embodiments, the multifunction tray table assembly 500 may include a portion of pivot face 502 that is statically mounted to upright arm 503 such that the static portion remains in place to function as an arm rest even when both the first face 502a and the second face 502b are pivoted toward the deployed position. In other words, in the view shown in FIG. 5C, the static portion would extend from the upper portion of upright arm 503 in the opposite direction of the two deployed tray tables (approximately parallel to lower arm 505). Similarly, although not shown in the figures, in some embodiments, the multifunction tray table assembly 500 may include a panel that is statically mounted to upright arm 503 where the static panel is approximately the same size and shape as the two tray tables 501a and 501b. The static panel may remain in place to function as a divider even when both the first tray table 501a and the second tray table 501b are pivoted toward the deployed position.

Hollow Arm Rest Assembly

Figure 6A:
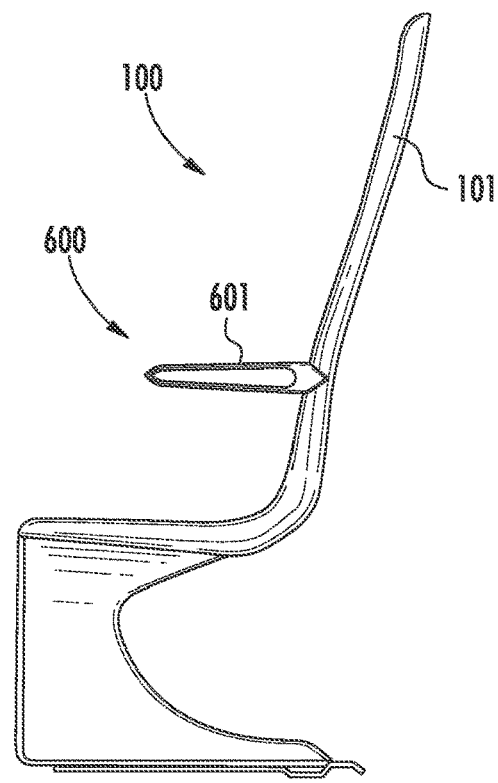
FIG. 6A is a side view of lightweight seats according to certain embodiments of the present invention.
Figure 6B:
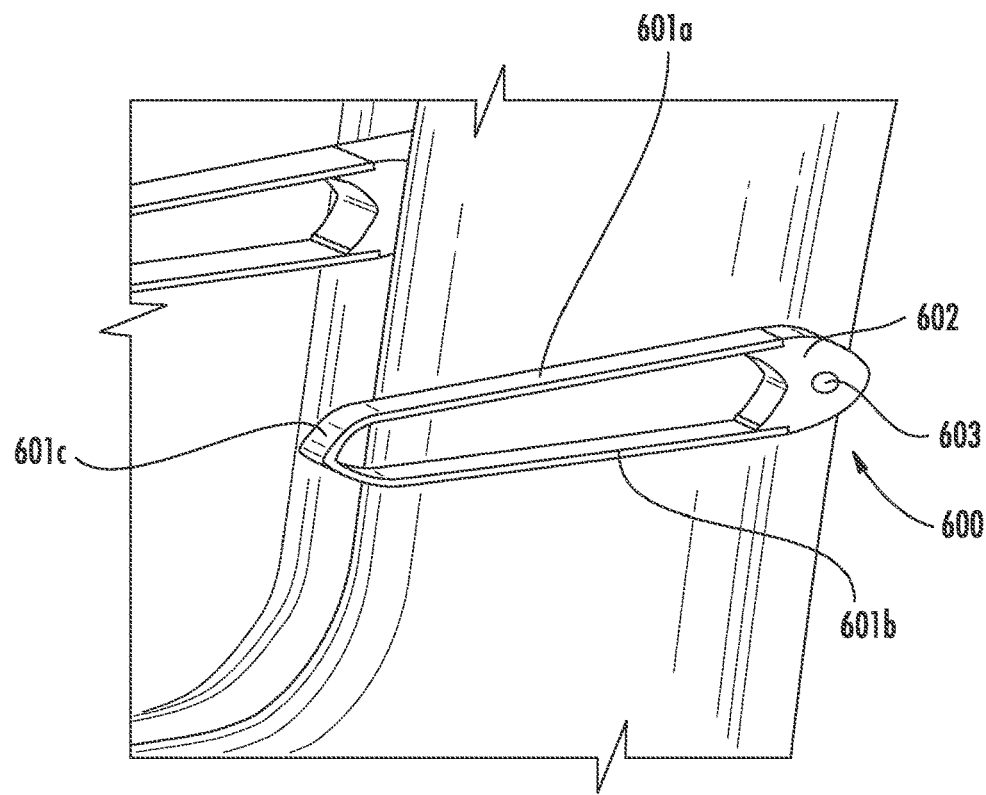
FIG. 6B is a detail perspective view of the lightweight seats of FIG. 6A.

As shown in FIGS. 6A and 6B, the lightweight seat 100 may include a hollow arm rest assembly 600. The hollow arm rest assembly 600 may include a root fitting 602 attached to the seat back 101 and a flexible blade 601 forming a loop and attached to the root fitting 602. The flexible blade 601 may include an upper portion 601a, a lower portion 601b, and an endcap 601c. The upper portion 601a, the lower portion 601b, and the endcap 601c may be separate pieces attached to one another or may be a single component. The flexible blade 601 is designed to flex based on the elasticity of the material and/or the geometry. The hollow arm rest assembly 600 may be statically mounted to the seat back 101 or may be configured to rotate about pin 603.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat comprising:
    a seat base;
    a seat bottom attached to an upper portion of the seat base;
    a seat back attached to a rear portion of the seat bottom; and
    an arm rest assembly attached to the seat bottom configured to move between a deployed position and a stowed position, wherein the arm rest assembly comprises:
        an arm rest comprising:

a first portion having a first end and a second end;
a second portion attached to the second end of the first portion; and
a tapered stud fitting extending from the first portion in a direction approximately parallel to a longitudinal axis of the first portion; and
an articulating fitting attached to the seat bottom and comprising an elongated slot, a rotation slot, and a locking cavity;
wherein the arm rest is pivotable over a range of approximately 90 degrees with respect to the articulating fitting;
wherein the tapered stud fitting engages:
the locking cavity when the arm rest is in the deployed position; and
the rotation slot during movement between the deployed position and the stowed position;
wherein movement of the tapered stud fitting into the locking cavity simultaneously causes a pin of the arm rest to traverse along the elongated slot.

2. The seat of claim 1, wherein the arm rest rotates about the pin.

3. The seat of claim 2, wherein the rotation slot comprises an arc centered about the elongated slot in the articulating fitting.

4. The seat of claim 1, wherein:
the tapered stud fitting has a partial cone shape and the locking cavity has a complementary shape.

5. The seat of claim 1, wherein the pin is cylindrical.

6. An arm rest assembly comprising:
an arm rest comprising
a first portion having a first end and a second end; and
a second portion attached to the second end of the first portion; and
a stud fitting extending from the first portion; and
an articulating fitting comprising an elongated slot, a rotation slot, and a locking cavity;
wherein the stud fitting engages:
the locking cavity when the arm rest is in a deployed position; and
the rotation slot during movement between the deployed position and a stowed position;
wherein movement of the stud fitting into the locking cavity simultaneously causes a pin of the arm rest to traverse along the elongated slot.

7. The arm rest assembly of claim 6, wherein the stud fitting comprises an axial direction that is approximately parallel to a longitudinal axis of the first portion.

8. The arm rest assembly of claim 6, wherein the arm rest pivots over a range of approximately 90 degrees with respect to the articulating fitting during movement between the deployed position and the stowed position.

9. The arm rest assembly of claim 6, wherein the arm rest rotates about the pin.

10. The arm rest assembly of claim 6, wherein
the stud fitting has a partial cone shape and the locking cavity has a complementary shape.

\* \* \* \* \*

UNITED STATES PATENT AND TRADEMARK OFFICE
CERTIFICATE OF CORRECTION

PATENT NO.         : 10,543,921 B2
APPLICATION NO.    : 15/128148
DATED              : January 28, 2020
INVENTOR(S)        : Philippe Augé

Page 1 of 1

It is certified that error appears in the above-identified patent and that said Letters Patent is hereby corrected as shown below:

On the Title Page

Item (71), change "Safran Seats, Issoudun (FR)" to "Safran Seats, Plaisir (FR)"

Signed and Sealed this
Seventh Day of July, 2020

Andrei Iancu
*Director of the United States Patent and Trademark Office*